(12) United States Patent
Von Drehnen et al.

(10) Patent No.: US 8,306,881 B2
(45) Date of Patent: *Nov. 6, 2012

(54) TAX TRANSACTION SYSTEM

(75) Inventors: Druvaan B. Von Drehnen, Queanbeyan (AU); Sean Shine, Rathgar (IE); Timothy M. Finnegan, Great Falls, VA (US); David Roland Hunter, Mosman (AU); Stephanie Lynn Willette, North Chatham, NY (US)

(73) Assignee: Accenture Global Services GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/898,460

(22) Filed: Oct. 5, 2010

(65) Prior Publication Data

US 2011/0022486 A1    Jan. 27, 2011

Related U.S. Application Data

(63) Continuation of application No. 10/429,014, filed on May 1, 2003, now Pat. No. 7,809,614.

(30) Foreign Application Priority Data

May 2, 2002  (EP) .................................. 02394054

(51) Int. Cl.
*G06F 17/22* (2006.01)
*G07F 19/00* (2006.01)
(52) U.S. Cl. ........................................ 705/31; 705/19
(58) Field of Classification Search ........................ None
See application file for complete search history.

(56) References Cited

U.S. PATENT DOCUMENTS

| 5,987,429 A | 11/1999 | Maritzen et al. |
| 6,078,899 A | 6/2000 | Francisco et al. |
| 6,223,168 B1 | 4/2001 | McGurl et al. |
| 6,411,938 B1 | 6/2002 | Gates et al. |
| 6,889,200 B2 * | 5/2005 | Agee et al. ...................... 705/19 |

(Continued)

OTHER PUBLICATIONS

Search Report dated Jul. 29, 2002 for European Patent Application No. 02394054 (1 page).

(Continued)

*Primary Examiner* — Luna Champagne
(74) *Attorney, Agent, or Firm* — Finnegan, Henderson, Farabow, Garrett & Dunner, L.L.P.

(57) ABSTRACT

A tax transaction system, and combined sale and tax transaction systems, are disclosed for use in electronic commerce for the deduction of a tax, which may be a sales tax, value-added tax, or any tax on income related to a transaction or taxing event. A trusted third party server system (300, 1060) may be provided which handles the calculation and/or deduction of a tax, e.g. related to a transaction of the sale of a good or service from a seller (200) to a buyer (100), on behalf of the seller, and which further provides for the remission of the tax to a tax collection agency (500, 1090), and which may perform the entire sale and tax transaction by proxy on behalf of the seller. Software modules (1070) including objects which embody instruction code and data structures to enable integral tax calculation and collection solutions, including multi jurisdictional tax calculation, remission and reporting, and even real time tax collection at point of sale, are provided. Such modules may form part of a data processing system hosted by a third party to a taxing event transaction, or be distributed in a pervasive manner, such as via the Internet in multiple server locations, as a downloadable client module, embodied in multiple hardware devices such as smartcards, electronic tags, radio frequency identification (RFID) tags.

20 Claims, 10 Drawing Sheets

U.S. PATENT DOCUMENTS

| | | | |
|---|---|---|---|
| 6,983,261 | B1 | 1/2006 | Francisco et al. |
| 6,993,502 | B1 | 1/2006 | Gryglewicz et al. |
| 7,379,907 | B2 * | 5/2008 | Dang et al. ............ 705/31 |
| 2002/0111888 | A1 | 8/2002 | Stanley et al. |
| 2003/0040992 | A1 | 2/2003 | Ryan et al. |
| 2003/0105686 | A1 | 6/2003 | Dang et al. |

OTHER PUBLICATIONS

Communication and Examination Report dated Feb. 7, 2008 for European Patent Application No. 02394054.7-2221 (7 pages).

Noting Loss of Rights dated Sep. 19, 2008 for European Patent Application No. 02394054.7-2221 (1 page).

Declaration of Non-Establishment of International Search Report dated Jul. 24, 2003 for International Application No. PCT/EP 03/04584 (2 pages).

Examination Report dated Mar. 11, 2010 for Canadian Patent Application No. 2,485,277 (5 pages).

Examination Report dated Aug. 11, 2010 for Indian Patent Application No. 2725/CHENP/2004 (2 pages).

* cited by examiner

TAX TRANSACTION SYSTEM

This is a continuation of application Ser. No. 10/429,014, filed May 1, 2003, and now U.S. Pat. No. 7,809,614, which claims benefit of European Patent Application No. 02394054.7, filed May 2, 2002, and published as EP 1359523 A1 both of which are incorporated herein by reference in their entireties.

FIELD OF THE INVENTION

The present invention relates to a tax transaction system, in particular to a data processing method, computing apparatus and computer software for handling the calculation and/or deduction of a tax, which may be a sales tax or any tax on income related to a transaction or taxing event. The present invention may provide a trusted third party server system which handles the calculation and/or deduction of a tax or commission related to a transaction of the sale of a good or service from a seller to a buyer, which further provides for the remission of the tax or commission to another party, and which may perform the entire sale and tax transaction by proxy on behalf of the seller. The present invention also provides multi-jurisdictional tax calculation, remission and reporting software products, which may be accessible across a computer network such as the Internet, or which may have components embedded in client hardware devices such as smartcards and radio frequency identification devices, for facilitating automatic or real time tax transactions.

BACKGROUND TO THE INVENTION

Taxes on consumption and indirect taxes related to the sale of goods and services are levied in practically every country of the world, as are direct taxes on income and capital. Some examples include the following:

United States of America (U.S.A.)

In the U.S.A., each state is empowered to levy its own state sales tax; each county in each state is also empowered to collect taxes related to the sale of goods and services, such that in the U.S.A., there are more than 7500 separate tax collection agencies.

European Union (E.U.)

In the European Union, each member state is empowered to impose a value added tax (VAT) to be applied at every stage of the production of a commodity, and is charged only on the value added at that stage. In E.U. member states, value added taxes are known by the acronyms VAT, CAT, TVA, MWST, IVA, BTW, FPA, MOMS. When the good or service is sold, the VAT paid at earlier stages cannot be reclaimed, and the final purchaser normally becomes liable on the sale of goods and services, at different rates for different goods and services, with different standard rates in different states. The trader must remit VAT on goods sold to the tax collection agency, but the transaction process is burdensome and complex, as any VAT paid by the trader on purchases may be reclaimable.

In Ireland and the United Kingdom, tax on income may be collected at source by the employer in a "pay as you earn" system, where the employer performs the tax transaction with the tax collection agency. Banks are empowered to collect tax at source on interest earned by depositors. As in other countries, income and capital taxes may also be remitted directly by the taxpayer to the tax collection agencies.

Canada

In Canada, a value added tax called GST is imposed.

Australia

In Australia, as well as income taxes and taxes on goods and services, there is a fringe benefits tax and a capital gains tax. The latter is paid on any capital gain or profit made when an asset is sold for more than was paid for it, whether by an individual, company, trust or fund manager.

South Africa

South Africa has a national system of tax revenue generation, with no state, county, or local taxes. National taxes include value added taxes (VAT), sales and import taxes, customs and excise, and income taxes. A skills levy tax at 1% of payroll is collected by employers, but despite the fact that a majority of employers are eligible to reclaim 80% of the total paid, many do not go through the effort of completing the process.

General Remarks:

Indirect taxes may be levied for different types of sale transaction, such as wholesale (business to business), retail (business to consumer), or when importing goods and services (foreign seller, local buyer). Further excise taxes, levies and duties may be imposed on the sale of goods such as alcoholic beverages, tobacco products, and petroleum fuels, and services such as bookmaking on bets.

In general, the burden of compliance and of collecting such indirect taxes falls upon the seller, who also has to remit the tax to a tax collection agency in a separate transaction, at a different time from the original sale transaction.

If the seller is located or domiciled in one state or tax jurisdiction, and the buyer is located in another, the local sales tax at the buyer's location may not be applicable to that sale transaction. The buyer may or may not be liable to a "use tax" or to an import tax, depending upon both the buyer's and the seller's location. In other instances, both the buyer and the seller may each be liable to pay an element of tax in relation to a particular transaction. The particular good or service may be subject to a reduced tax, or be tax exempt so a tax on that sale may not be applicable. All of this places a very considerable bookkeeping and accounting burden on the seller to collect and remit the correct amount of taxes. With interstate commerce, and especially with e-commerce, there is the problem of determining the venue of a transaction, whether a transaction involves a taxable event, and then calculating the applicable taxes for that sale transaction, which can involve considerable complexity.

There will be the inevitable trend for businesses offering goods and services for sale via the Internet to domicile their operations in a location which minimizes liability, or legitimately avoids liability on the seller to collect and the buyer to pay any tax associated with the sale transaction. For example, for many years traditional mail order businesses in the U.S.A. have legitimately located their domicile or nexus in the state of Rhode Island, the smallest state by size and of relatively small population as compared to the rest of the United States of America, such that their customers located in the other 50 states do not pay any local state sales tax. Such a model may easily be followed by a legitimate on-line business operation, even from an offshore tax haven, since on-line retailers likewise do not require to be physically located anywhere near their customers. This has already happened with on-line betting firms, to avoid government taxes on payout of winnings. Governments and revenue agencies around the world recognize such a trend as a potential tax drain, of considerable magnitude. Sales tax may be a state's biggest source of tax revenue in the U.S.A. and VAT accounts for an average of 40% of Europe's tax revenues.

It is accepted by these authorities that, as the volume of e-commerce increases, goods and services sold over the Internet cannot be allowed to avoid such an important tax. Conventional "bricks and mortar" retailers are also put at an unfair price disadvantage. The principle is established that a tax may be levied on a good or service sold electronically, at the rate prevailing in the country where the consumer is located. However, the Internet makes it harder to pinpoint the identity and location of individuals or businesses engaged in taxable activities. A domain name may give no clue as to the physical location of a site. Furthermore, when anonymous digital cash is introduced, potential taxpayers will become even harder to identify. In reality all of this poses not only a legislative difficulty, on an international scale, but also a considerable technical problem in how to integrate the electronic calculation, collection and remission of taxes with the sale transaction itself, in a manner which effectively removes the actual burden of tax collection from the seller. Nevertheless, it ought to be possible to design and implement a more efficient method and means of calculation and collection of the tax or commission element of a sale transaction, in the context of electronic commerce. This is an object of the present invention.

Advances have been made in the development of electronic commerce protocols providing safe mechanisms for performing an electronic sale transaction, such as Secure Electronic Transactions (SET), Secure Key Internet Protocol (SKIP), Secure Socket Layer (SSL). In inter-application cooperation recent developments include the Joint Electronic Payment Initiative (JEPI), and the Java Electronic Commerce Framework and the Gateway model of Sun Microsystems, Inc.

However, such mechanisms only provide for a means of secure payment from the buyer to the seller. Electronic sale transaction mechanisms known in the art in general have addressed a transaction between two parties, a seller and a willing buyer. If the sale price includes a simple commission for a third party, and/or a sales tax to be remitted to a third party, that element of the transaction remains to be carried out or completed in a separate and later transaction, by the seller. What appears to the buyer of a good or service to be a straightforward transaction, is in fact from the seller's point of view not really a single transaction.

Software exists for the calculation of U.S. sales taxes such as that offered by Taxware, Vertex, and TaxBay. Each of these companies provide tax calculation, and in some cases, tax payment software. Such software is useful in automating the correct calculation and application of U.S. sales taxes, and in facilitating correct returns of taxes to be made to the relevant tax collection agencies. Payroll software systems enable calculation and remission of income taxes on behalf of employees in "pay as you earn" systems, in the U.K. for example. However, the process of remitting returns used in order to calculate taxes due is still an entirely separate operation, and existing tax calculation software only simplifies to an extent the collection of such taxes, which is still ultimately the seller's or taxpayer's responsibility. In addition, the automated payment of taxes continues to be handled as an entirely separate operation as well. No existing software provides an integral solution, which completely automates the calculation, collection, and remission of a tax at point of sale, which may even be in real time, in a taxing event transaction between two parties (e.g. buyer and seller, employer and employee) and in a consequent tax remit transaction with a tax collection agency, whether in an e-commerce environment or in a conventional retail or business environment. There are considerable technical challenges from a software engineering viewpoint, in designing such an integral solution, involving the highest levels of security, massive amounts of data throughput, dynamic data tables to instantly reflect changes in tax rates, etc., and scalability to a truly global system for e-commerce and Internet applications. It is an object of the present invention to provide software modules including objects which embody instruction code and data structures to enable just such an integral solution, including real time tax collection, which modules may be distributed in a pervasive manner, such as via the Internet in multiple server locations, as a downloadable client module, embodied in multiple hardware devices such as smartcards, electronic tags, radio frequency identification (RFID) tags.

Many Internet business models have so far been based on the principle of disintermediation, removing a conventional middleman activity entirely from the chain of commerce. On-line selling of items such as books, which are shipped directly from wholesaler to consumer, cutting out the retailer, is one example. The offering of insurance and loan products direct from financial institutions to consumers, cutting out a conventional brokerage service, is another example. However, some embodiments of the present invention use the opposite approach and seek to address the economic and technical problems discussed above, by providing a different model which reintermediates the tax collection process, in effect by providing a new trusted third party or government-certified intermediary to perform the calculation, collection and remission of the tax element of a sale transaction in the background, as part of the sale transaction, on behalf of the seller, or the buyer, as the case may be. The trusted third party may be embodied as a new tax collection service provider operating a centralized tax transaction server system in accordance with one embodiment of the invention, or may be embodied as a novel distributed software module downloaded by a client for performing a combined sale and tax transaction directly by the client in accordance with another embodiment of the invention. In yet further embodiments, in instances where it may be only necessary to remit taxes to a tax collection agency by specified dates in the year, for example as with income and capital taxes, tax payments for an individual taxpayer may be made to an intermediary bank account after automatic calculation and deduction, where the taxpayer may access and modify the account before the tax due date, and where the tax collection agency may be authorized to directly debit the account at the tax due date.

Other embodiments of the present invention follow the disintermediation model to its extreme, by removing all intermediary activity and permitting the tax element of a sale transaction to be remitted to a tax collection agency instantaneously with the sale transaction of a good or service itself, in real time, at point of sale.

SUMMARY OF THE INVENTION

The present invention relates to a tax transaction system, and combined sale and tax transaction systems, in particular to systems, software, including computer program products and storage media and signals on a carrier wave embodying same, and methods, for handling and automating the calculation and deduction of a tax, in accordance with claims which follow.

The present invention provides a tax transaction system, for handling the calculation and deduction of a tax due to a tax collection agency, comprising;

first data communication means to receive input relating to a taxing event including a first identifier identifying the tax jurisdiction in which the event has occurred and a second identifier identifying information on parties to the taxing event, a first database with tax rate and taxing event data for a plurality of tax jurisdictions linked to said first and second identifiers, first data processing means for calculating the tax due on the taxing event by reference to said first database, second data communication means linked to a third party computer system, a means for performing a tax remission transaction to said third party computer system based on said calculated tax due for payment associated with said taxing event.

Such a system has the advantage that it may be used for automating, to whatever degree is required, the calculation and collection of direct taxes such as income tax, and capital taxes, associated with a taxing event, when that event occurs, e.g. in electronic transactions involving the payment of salary or remuneration from an employer to an employee, the deduction at source of a tax on interest, the payment of a withholding tax in a transaction between two parties, or a capital gains tax in a financial transaction, etc.

The data processing means or tax calculation engine at the heart of the present invention is preferably embodied as a software module or object comprising:

instruction code for receiving input from a first data communication means relating to a taxing event including a first identifier identifying the tax jurisdiction in which the event has occurred and a second identifier identifying information on parties to the taxing event, a data structure with tax rate and taxing event data for one or more tax jurisdictions linked to said first and second identifiers, a tax calculation engine for calculating the tax due on the taxing event by reference to said data structure or to an external database, instruction code to communicate output with a second data communication means linked to a third party computer system, instruction code to enable a means for performing a tax remission transaction to said third party computer system based on said calculated tax due for payment associated with said taxing event.

In embodiments of the present invention described in more detail below, this software module or object will be sometimes referred to as a "Tax Button". Such a module has the advantage of permitting the system to be pervasive, residing for example in any one of:
 a client side computer system,
 a thin client,
 a server side computer system,
 a computer network,
 a mobile computing device,
 a programmable IC device embedded in a smartcard or RFID tag,
 a computer-readable storage media,
 a software agent.

The present invention also provides a combined sale and tax transaction server system, comprising:

first data communication means to receive a confirmed offer of sale or sale transaction record from a first client device including a first identifier identifying the tax jurisdiction in which the sale has been transacted and a second identifier identifying the location of the buyer, a first database with tax rate and taxing event data for a plurality of tax jurisdictions linked to said first and second identifiers, first data processing means for calculating the tax due on the sale transaction by reference to said first database, a second database for storing details of the transaction record and of the calculated tax due for payment associated with that transaction, second data communication means linked to a second client computer, a means for performing a tax remission transaction to said second client computer based on said stored calculated tax due for payment associated with that transaction.

Such a system, and its associated software, has the advantage that it may be used for automating, to whatever degree is required, the calculation and collection of indirect taxes such as sales taxes and value added taxes, even allowing the deduction and remission of such taxes to the tax collection agency to happen in the background, without intervention from, or knowledge of, the buyer or seller. A third party service provider, intermediary or credit company, may host the data processing means or tax calculation engine, taking responsibility from the buyer for the actual remission of the sales tax element of the sale transaction. In some embodiments of the invention, systems and software are provided for performing a combined sale and tax transaction in real time, at point of sale, with or without an intermediary host.

The invention will now be described with reference to preferred embodiments thereof, as shown in the accompanying drawings, but is not limited to the following description.

DETAILED DESCRIPTION

Figure 1:
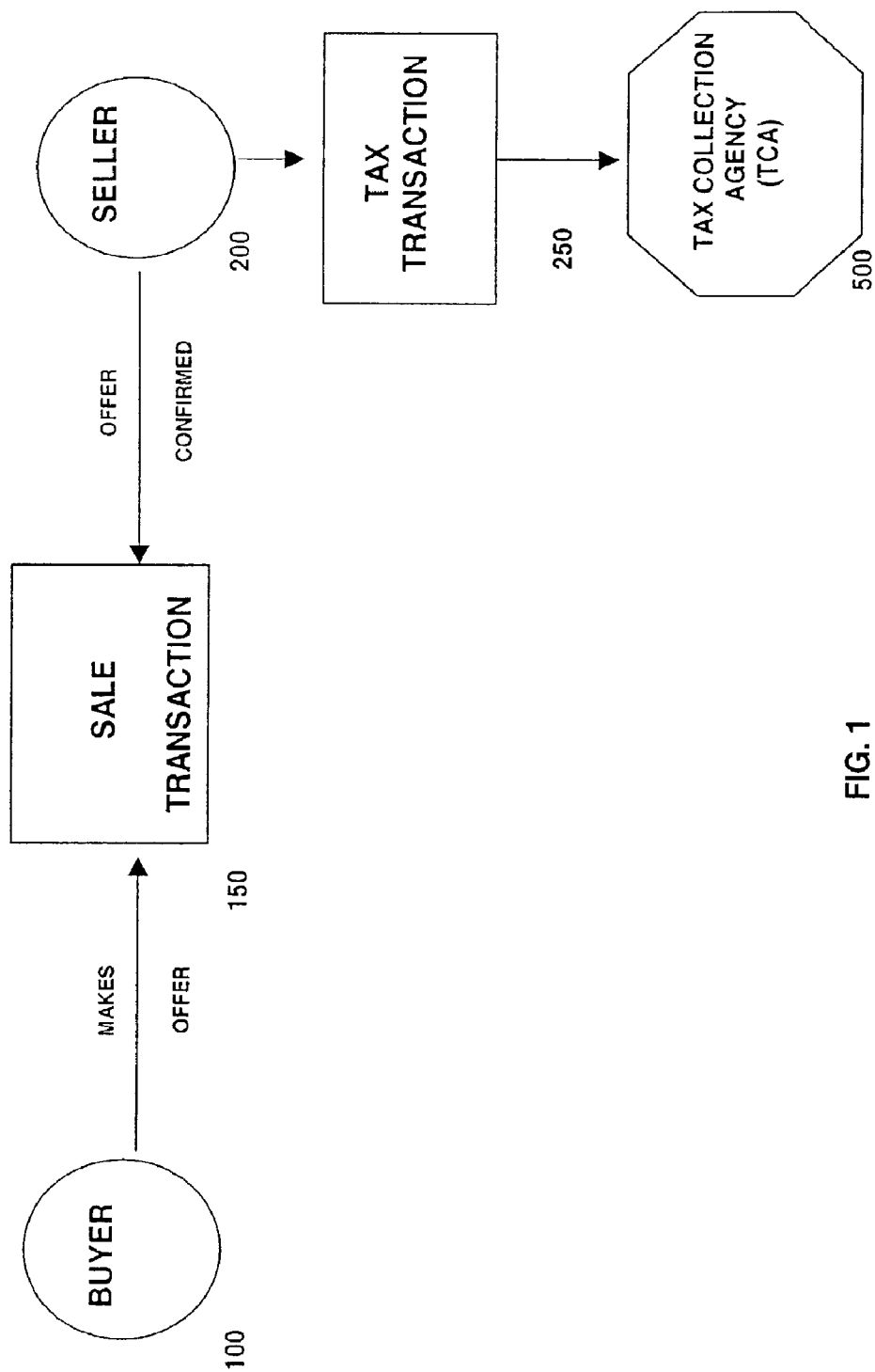
FIG. 1 illustrates the conventional business model for performing a separate sale transaction and separate tax transaction.

In accordance with the conventional business model shown in FIG. 1, a buyer 100 makes an offer to a seller 200 for the purchase of a good or service. The seller confirms the offer and this may involve the validation and authentication of the buyer's identity and acceptance of the credit or payment instrument offered by the buyer. The sale transaction 150 is then completed and the sale amount plus a tax due amount is tendered by the buyer to the seller. The seller 200 then remits the tax due amount to the tax collection agency 500 in a separate tax transaction, for example when making a sales tax or value added tax return. The seller thus has the additional burden of acting as an agent for the tax collection agency.

Figure 2:
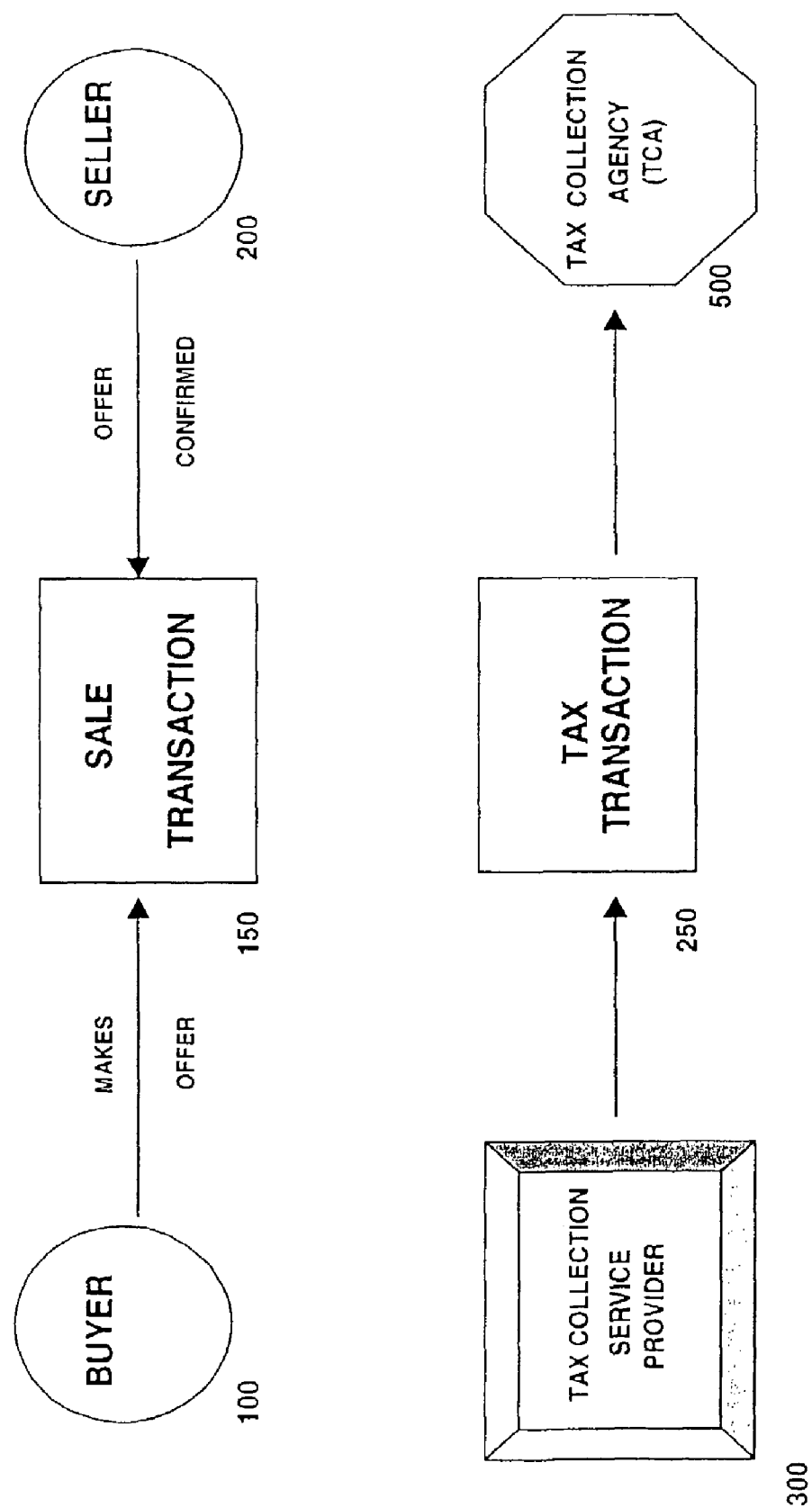
FIG. 2 illustrates a business model followed by a first embodiment of the present invention, for performing a separate sale transaction and proxy tax transaction.
Figure 3:
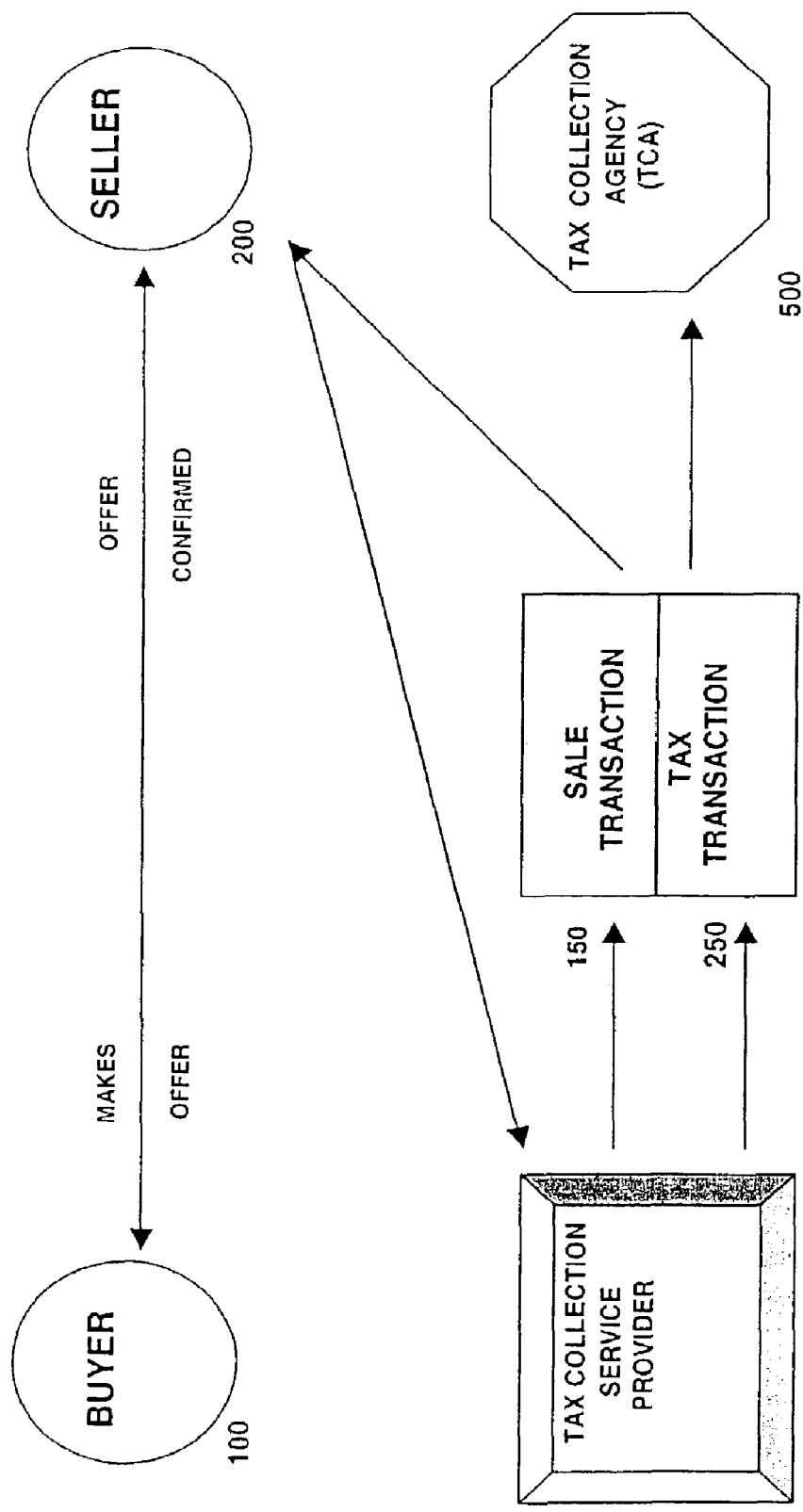
FIG. 3 illustrates a business model followed by a second embodiment of the present invention, for performing a combined proxy sale and tax transaction.
Figure 4:
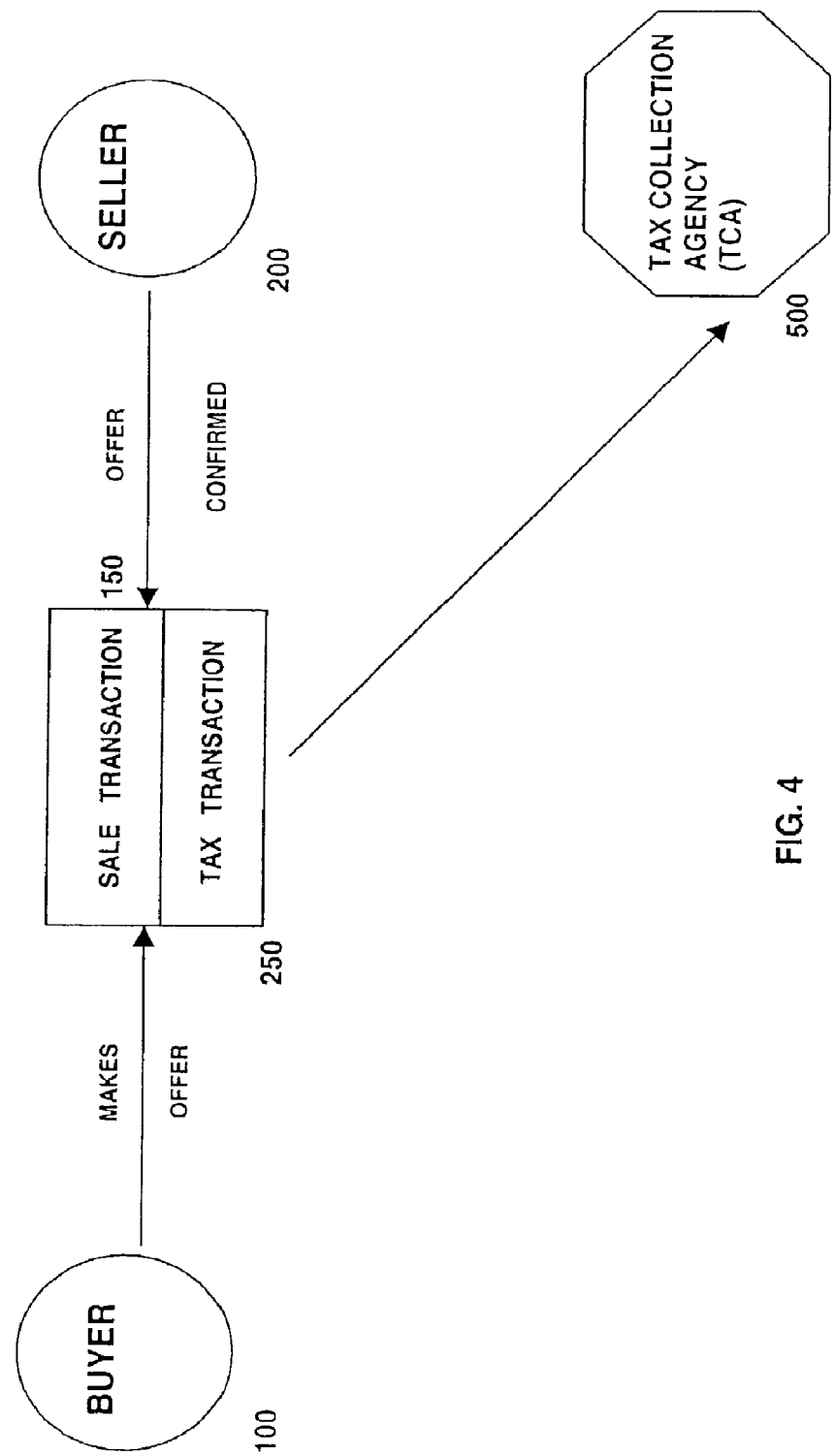
FIG. 4 illustrates a business model followed by a third embodiment of the present invention for performing a combined sale and tax transaction.

FIGS. 2 to 4 illustrate alternative business models on which the present invention is based. The present invention seeks to provide a sale transaction server system, which may be operated by a trusted third party or tax collection service provider 300, to perform a proxy sale and/or tax transaction on behalf of the seller, or to directly perform a combined sale and tax transaction by the seller. In all cases, the seller does not have to worry about the accuracy of the tax transaction, remitting the taxes due or filing returns to the relevant tax authority.

FIG. 2 illustrates a first model in which the buyer 100 makes an offer to the seller 200 for the purchase of a good or service. The offer is confirmed by the seller and the sale transaction 150 is completed by the seller. The seller transmits a record of the confirmed sale transaction to the tax collection service provider 300, who then handles the tax transaction 250 by proxy, remitting funds of the tax due to the tax collection agency 500, and periodically billing the seller for that amount plus a small commission. This would be similar to any other credit service. The tax collection service provider will compile and send tax returns in the appropriate form to the tax collection agency and report to the seller, thus removing much of the burden from the seller. This embodiment of the invention is simply a tax transaction system.

Figure 6:
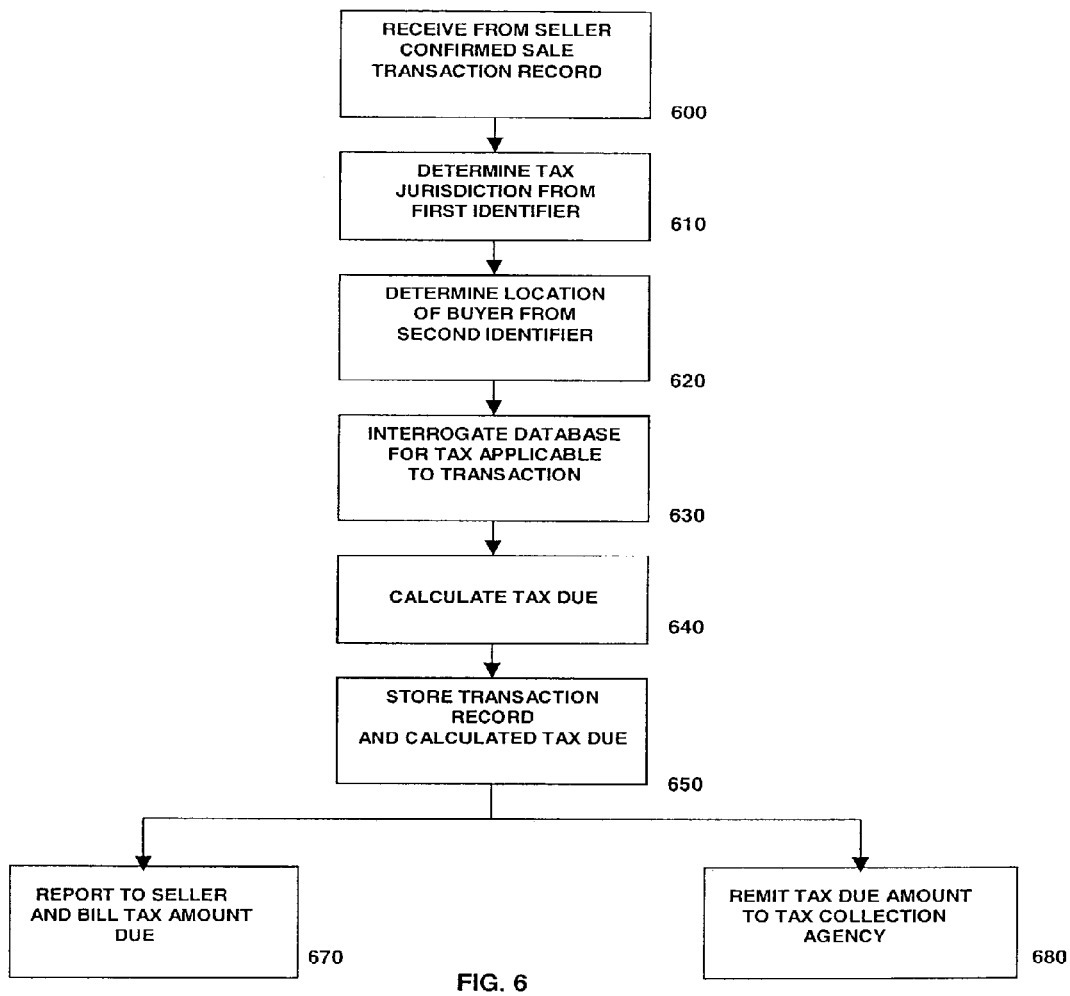
FIG. 6 is a flow diagram illustrating a software method for implementing the business model shown in FIG. 2.

FIG. 6 shows a software method implementing the model described with reference to FIG. 2. After the confirmed sale transaction record has been received 600 from the seller, the relevant tax jurisdiction is determined 610 from a first identifier associated with the sale transaction record, which will be linked to the location of the seller. The buyer's location is determined 620 from a second identifier associated with the sale transaction record, which will decide the applicability of the taxing event. A database is then interrogated 630 to determine what tax and what tax rate is applicable to the transaction. This data is processed and the tax due is calculated 640. The transaction record and the calculated tax due are then stored 650, and periodically in a reporting and billing step 670, the seller is billed the tax amount due which will have been received from the buyer. At a time agreed between the tax collection service provider and the tax collection agency, the tax due amount is remitted 680 to the tax collection agency in a later tax transaction, which may be an aggregated tax transaction on behalf of that seller, or on behalf of different sellers subscribing to the service.

FIG. 3 illustrates a second model in which the buyer 100 makes an offer to the seller 200 for the purchase of a good or service. The offer is confirmed by the seller but the sale transaction 150 is not completed by the seller. The seller transmits a record of the confirmed offer by the buyer to the tax collection service provider 300, who then handles the completion of the sale transaction 150 and the tax transaction 250 by proxy for the seller. In this model, the tax calculation and tax payment all occur as part of the core sale transaction, in the background. This embodiment of the invention is a combined sale and tax transaction system.

Figure 7:
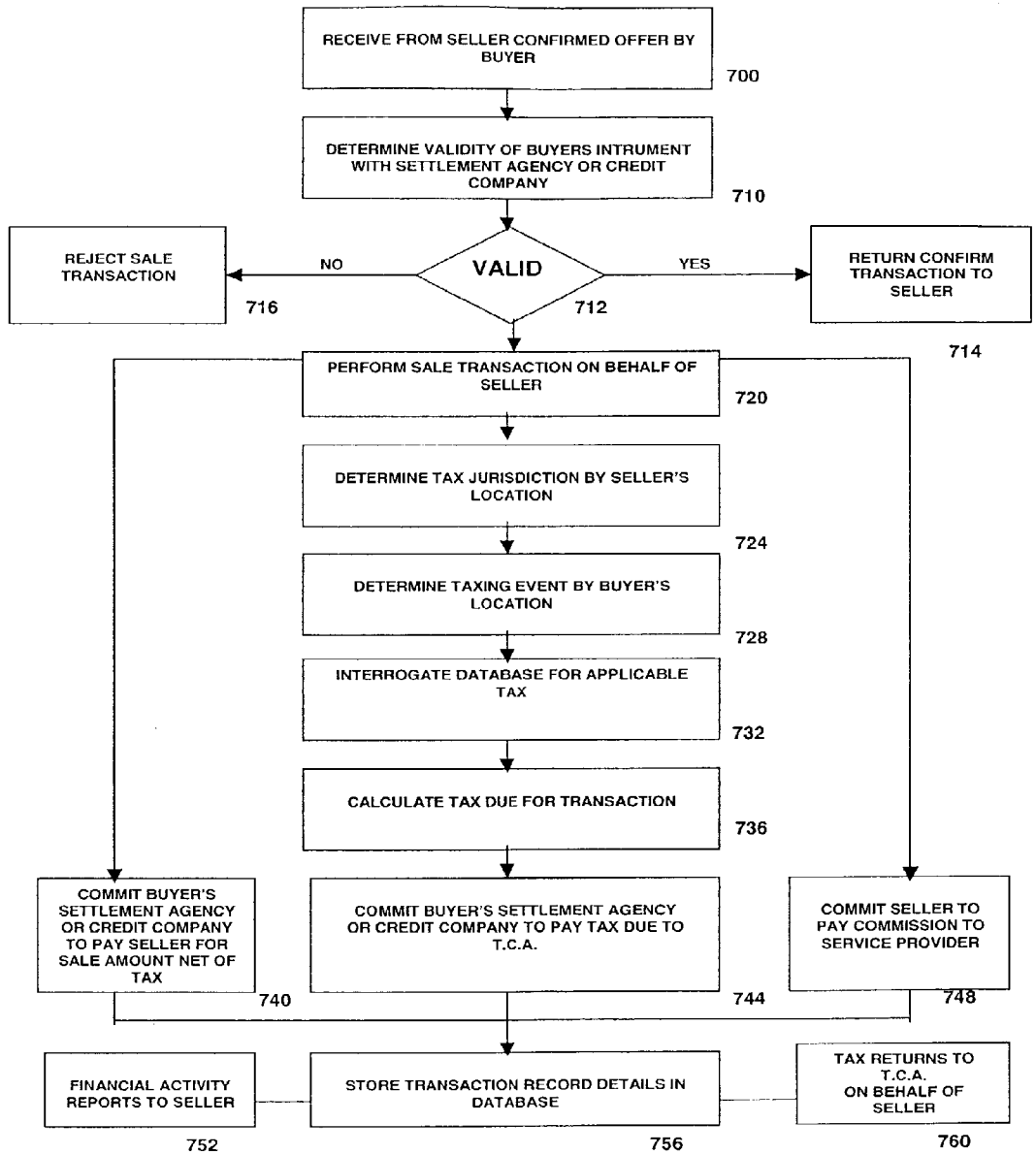
FIG. 7 is a flow diagram illustrating a software method for implementing the business model shown in FIG. 3.

FIG. 7 shows a software method implementing the model described with reference to FIG. 3. After a confirmed offer for the purchase of a good or service by the buyer has been received 700 from the seller, the validity of the buyer's sale instrument, e.g. a debit card, is checked with the settlement agency, e.g. a bank, or the buyer's available credit is checked with a credit card issuer in a validation step 710. If the offer is valid, a confirm transaction message is returned 714 to the seller. If the offer is invalid, a reject sale transaction message is returned 716 to the seller. The sale transaction is then performed 720 on behalf of the seller by the tax collection service provider. This involves committing 740 the identified buyer's settlement agency or credit company to pay the seller for the sale amount net of tax for the transaction. Before this, the relevant tax jurisdiction is determined 724, which will be linked to the location of the seller. The applicable taxing event is determined 728 by reference to the buyer's location. A database is then interrogated 732 to determine what tax and what tax rate is applicable to the transaction. This data is processed and the tax due is calculated 736. The tax transaction is then completed by committing 744 the buyer's settlement agency or credit company to pay the tax due element of the total transaction to the tax collection agency. A further transaction is completed at the same time, which is to commit the seller to pay the tax collection service provider's commission or fee for performing the service. In this more elegant solution, all transactions may be completed in real time, with the whole burden of sale transaction processing and of tax transaction processing removed from the seller. The tax collection service provider only collects its fee. The buyer is oblivious to mode of the transaction process, i.e. will not necessarily know that the whole sale transaction has not been processed directly by the seller.

In a follow up to the sale transaction processing by the tax collection service provider, software may implement the steps of storing the sale and tax transaction record in a database, and from this providing 752 financial activity reports to the seller's computer system, and providing 760 tax returns if required by the tax collection agency on behalf of the seller. However, as each tax payment to the tax collection agency will identify the seller and the individual taxable transaction details, there should in theory be no need for summary tax returns to be reported from the seller to the tax collection agency. In its effect, the present invention provides a new paradigm for the collection of taxes related to consumption of goods and services, and the present systems operated by tax collection agencies involving the regular submission of certified tax returns to cover specified periods of trading, including paper returns, may become redundant.

Figure 5:
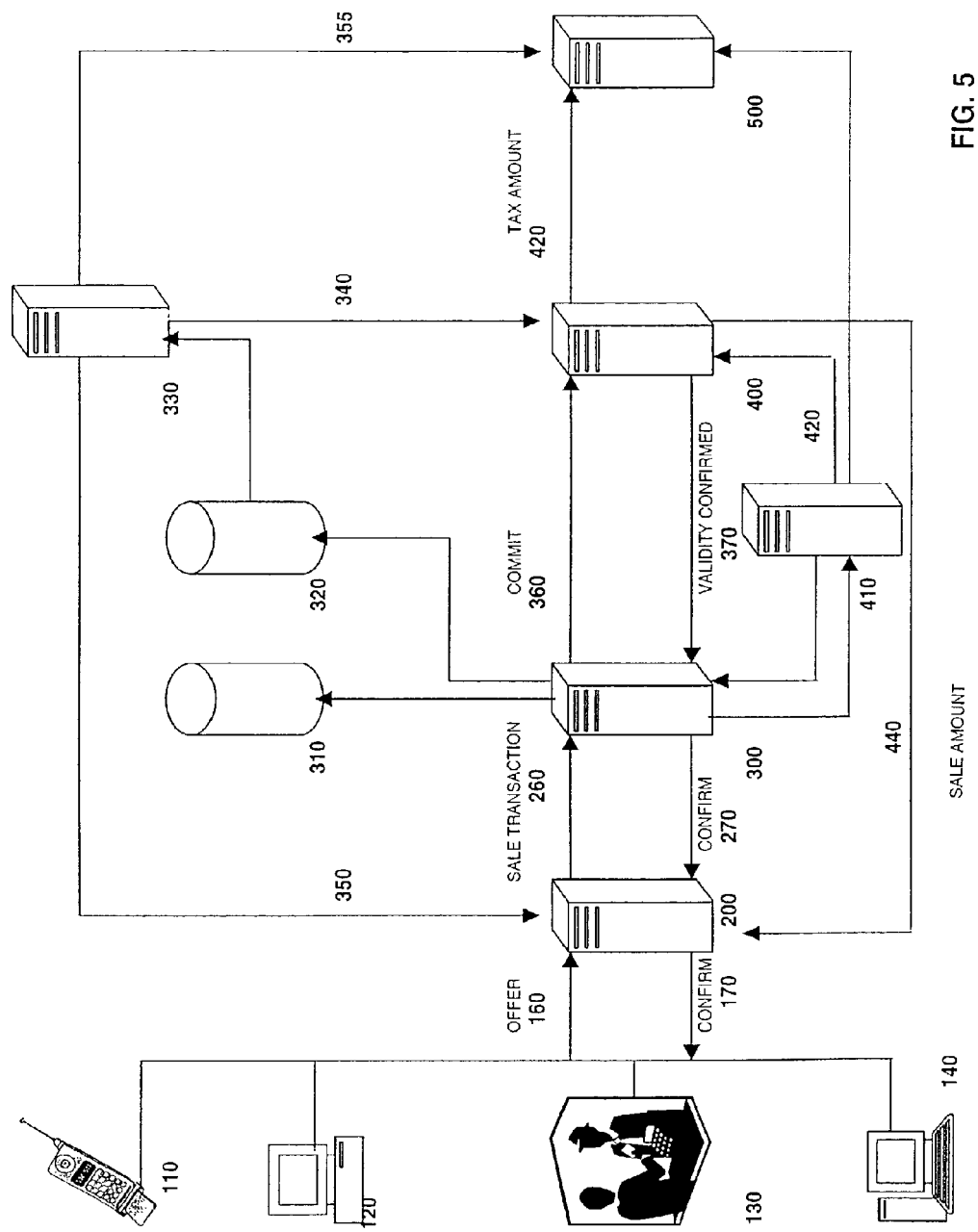
FIG. 5 shows a sale and tax transaction server system architecture in accordance with the present invention.

A combined sale and tax transaction server system architecture in accordance with the present invention is shown in FIG. 5. The buyer 100 may initiate a purchase of a good or service from a telephone device 110, which could be a credit card purchase made by voice or input to a web-enabled mobile telephone. The buyer may initiate an on-line purchase from a computer 120, tendering a credit card, or digital cash as an instrument to complete the sale, or using an electronic wallet application. The buyer may present a credit card, debit card, smart card, check or cash at a point of sale 130 in a retail establishment. The buyer may have initiated any business to business electronic sale such as via a purchase order transmitted to a transaction payment engine 140, which transmits the offer to the seller. In all cases, an offer to buy is made by the buyer and transmitted 160 from the buyer 100 to the seller's computer system 200. The seller may directly confirm 170 its acceptance of the offer to the buyer or to the buyer via the system which transmitted the offer.

In the first model, following FIG. 2, a record of the completed sale transaction is sent 260 to the tax collection service provider's server 300 and the tax transaction is completed (not shown in FIG. 5) by remitting the tax due to the tax collection agency server 500. Even though the service provider only performs the tax transaction associated with the sale, it will collect fees for this service from one or more of the participants and so can be viewed as both a buyer, "buying" taxes due from sale transactions, and then as a seller, "selling"

the taxes due to the appropriate tax collection agencies. The server 300 may therefore be viewed as both a server and a client, so that one skilled in the art will recognize that other system architectures are possible, such as a peer to peer configuration.

In the second model, following FIG. 3, the record of the offer is sent 260 to the tax collection service provider's server 300. The validity of the offer is checked 370 by negotiation with the buyer's settlement agency server 400, which may be an automated credit handling (ACH) server in a banking system, an electronic cash vendor, or a credit card company server 410. The tax is determined for the transaction according to steps 720-736 described above with reference to FIG. 7, by the server 300, and with reference to a database 310, holding details of all applicable taxes by tax jurisdiction, tax rates by jurisdiction and by specified goods and services, exemptions, taxable events, etc. A data processing module calculates the tax due for the transaction, and stores the result and the transaction details in a second database 320. A database management system 330 is configured to read data from the database 320 at periodic intervals and to complete the tax transaction by a batch process of aggregated tax payments by seller and by tax jurisdiction to the relevant tax collection agency, by communicating 340 with the service provider's settlement agency server to complete remission 420 of an aggregated tax payment to the tax collection agency server 500. The sale transaction is completed by the settlement agency server remitting 440 the sale amount of the transaction net of tax to the seller.

Alternatively, a credit card company may act as a further intermediary in the tax transaction settlement process, later passing the transaction 420 to the settlement agency server 400 before remission 420 to the tax collection agency server. The sale transaction is completed by billing the cardholder or buyer for the total sale (sale amount plus tax), and remitting the sale amount of the transaction net of tax to the seller.

The database management system 330 is configured to provide reports 350 to the seller of sales transactions handled on its behalf at desired intervals, and likewise to provide reports 355 to the tax collection agencies concerned of taxes remitted.

It will be appreciated that in the second model described above with reference to FIGS. 3, 5 and 7, that the tax collection service provider could be recorded by the tax collection agencies as the actual taxpayer as it has performed the sale transaction by proxy for the seller. There would of course be a heavy onus of compliance on the service provider, but as a major taxpayer, remitting more substantial and more timely tax receipts to tax collection agencies, it could expect to negotiate preferential treatment in respect of filing returns and the form of such returns, and generally negotiating simpler procedures in return for reducing the present high administrative overheads presently incurred by tax collection agencies dealing with a multiplicity of taxpayers.

FIG. 4 illustrates a third model in which a sale transaction 150 and its associated tax transaction 250 are combined and performed by a buyer or seller initiated action, without the direct intervention of a trusted third party service provider. In effect, this is a model for instantaneous or real time direct taxation at point of sale.

Figure 8:
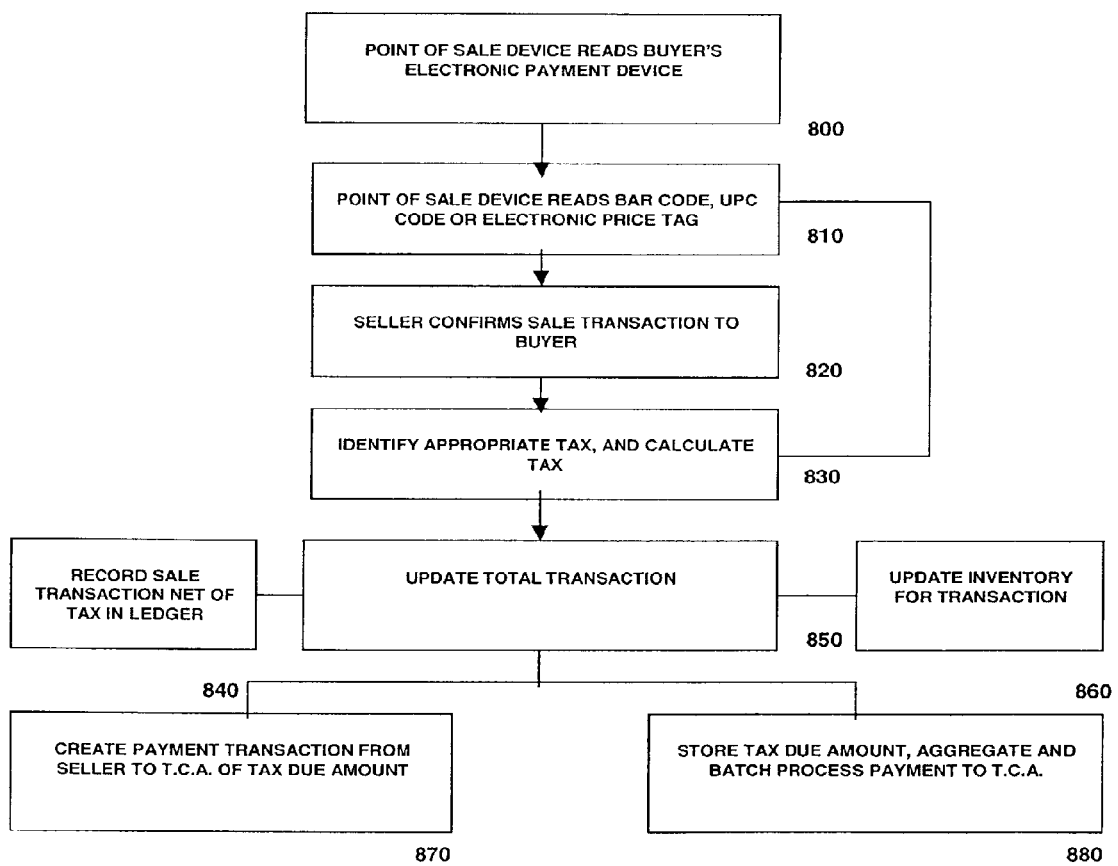
FIG. 8 is a flow diagram illustrating an a software method for implementing the business model shown in FIG. 4.

FIG. 8 illustrates an embodiment of the invention implementing such a model, where a buyer in a retail establishment brings a product to a point of sale for purchase. The buyer presents a payment device such as a credit, debit or store card, or smart card which is electronically read 800 by the point of sale device, as part of the offer for sale. The barcode, UPC code or smart tag data relating to the product item, encoded to include the net sale price amount and the sales tax due amount, is read 810 by a scanning device. Once the offer for sale has been accepted and confirmed 820 by the seller, the seller's computer system identifies 830, and if necessary calculates, the tax amount due from the input data. Then the system updates 850 the total transaction, recording 840 the sale transaction net of tax in a ledger, updating 860 an inventory database, and either (a) creates 870 a payment transaction from the seller to the appropriate tax collection agency of the tax due amount for that particular sale transaction, in a real time system, or (b) stores 880 that particular tax due amount for later aggregation and batch payment processing to the tax collection agency. In a further embodiment, all of this process may be implemented in software which responds to an input device replacing a point of sale device including a cash register and barcode scanning system, which senses a suitably encoded smart price tag, such as a RFID tag, when a shopper passes the sensing device with their purchase on exiting the store. The shopper pays the purchase price and sales tax to the retailer, the retailer pays the sales tax to the tax collection agency, all in one automated real time transaction, with no sales assistance.

Figure 9:
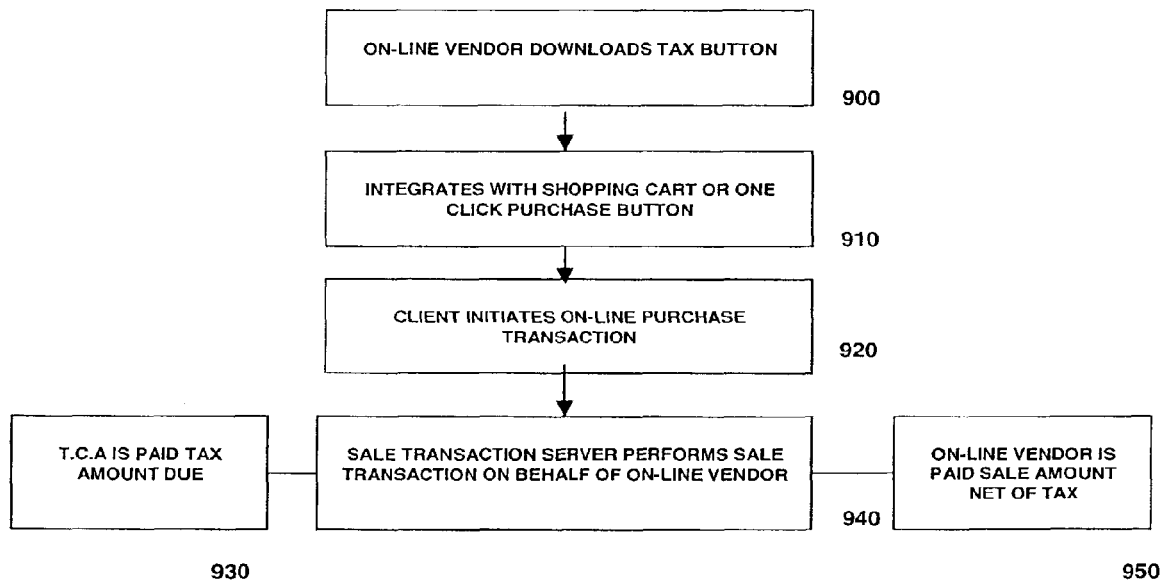
FIG. 9 illustrates a downloadable software module implementation in accordance with another embodiment of the present invention.

FIG. 9 illustrates yet a further embodiment of the invention, which may implement any one of the models of FIG. 2, 3 or 4 described above. An on-line vendor 200, which may be a small or large business, downloads 900 a software module or object, called a "Tax Button" from a central tax collection service provider's system 300, or from a tax collection agency's system 500, or from a software vendor. The "Tax Button" may for example be a Java™ applet for once off use within a browser application, or a Java™ cassette for repeated subsequent use within another application, linked for example to a shopping cart module or a one-click purchase button, and integrated 910 with the vendor's system.

A client computer belonging to a buyer logs on to the vendor's website, and the buyer initiates 920 an on-line sale transaction. In accordance with the FIG. 2 model, the on-line vendor may complete the sale transaction, passing a record to the tax collection service provider to process the tax transaction separately. In accordance with the FIG. 3 model, the sale transaction is passed to the server 300 at the tax collection service provider's site and both the sale and the tax transactions are performed 940 by the third party on behalf of the on-line vendor. In accordance with the FIG. 4 model, the downloaded module would include all the sale and tax transaction software modules necessary to perform the sale transaction, calculate the tax, and remit the tax all in one operation directly from the vendor's site. The "Tax Button" in the latter case represents a distributed version of the centralized server software described above with reference to FIGS. 6 and 7. There may be links to a central server system 300, 500, operated by a service provider or tax collection agency, so that the "Tax Button" may access tax table and tax rate data centrally held in a remote database 310.

Figure 10:
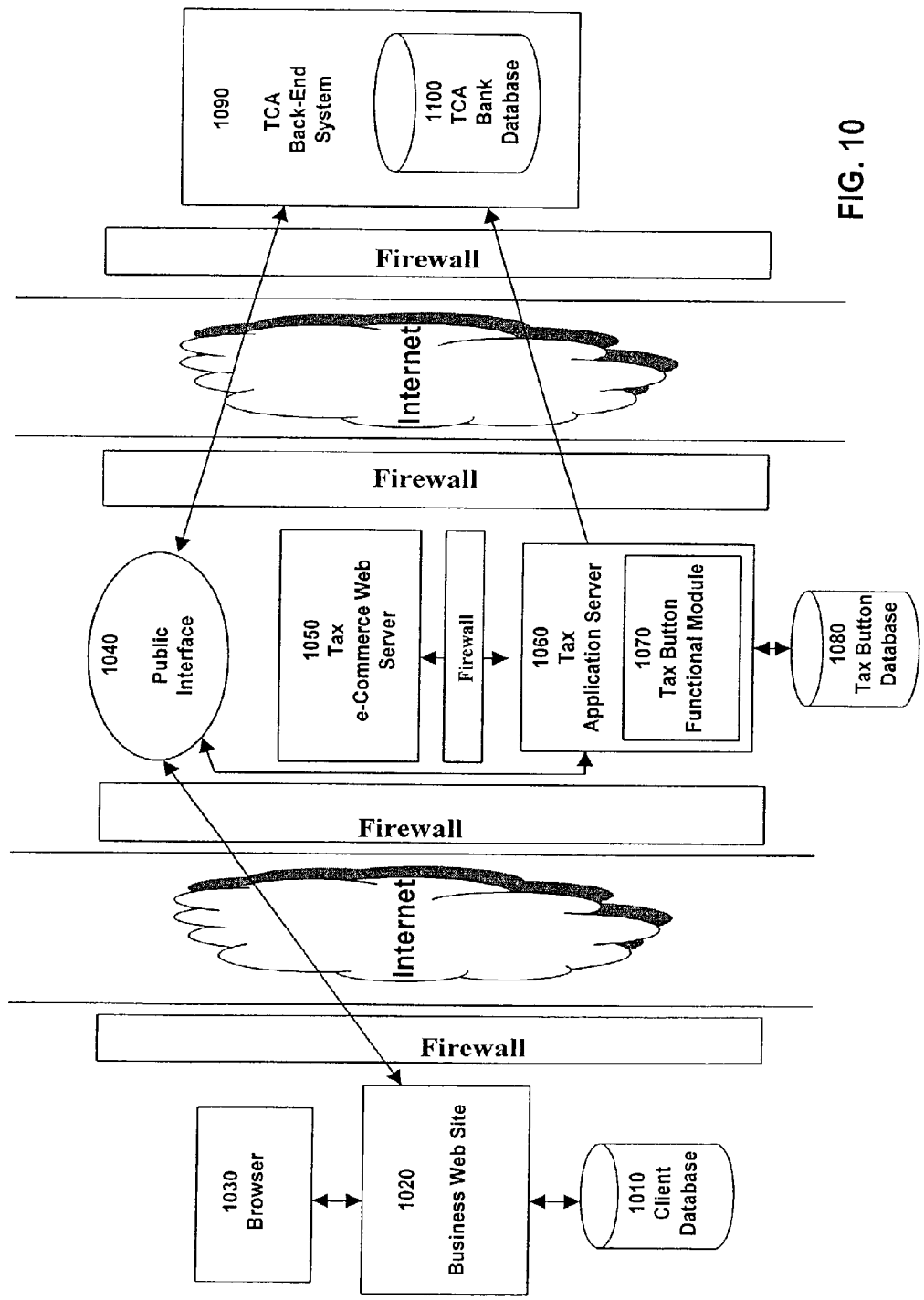
FIG. 10 shows a tax transaction server system architecture in accordance with a further embodiment of the present invention.

FIG. 10 is a high level technical architecture diagram illustrating the system components in a system for implementing embodiments of the present invention, including purely tax transaction systems, enabling for example the calculation of direct and capital taxes, and permitting the transacting of such taxes between a taxpayer or employee and a tax collection agency, and including combined sale and tax transaction systems, enabling for example the calculation of indirect and sales taxes, and permitting the transacting of a sale and of such taxes as described above. These embodiments entail use of the Internet, the existing system architecture of a business, the tax collection agency system architecture, and the tax transaction server architecture of the present invention. The business stores all information about its products and sales in a client database 1010. This links to the business website 1020, accessed by on-line customers using a client browser 1030. The business communicates via the Internet to a public interface 1040 of the tax transaction system, such as a DCOM, SOAP or JAVARMI interface, for communicating taxing events and transactions to the tax application server 1070. The business may also communicate via the public interface 1040 directly with the tax collection agency back end system. Alternatively, the business may log on to an e-commerce web server 1050, which acts as a front end for manual transactions and for reporting. For example, a monthly report describing all transactions over one month may be provided via the web server 1050.

The tax application server 1060 comprises a calculation engine or "Tax Button" functional module 1070, a document management component, a funds function component, a tax return preparation component, and a reporting and analysis functional component. The module 1070 may comprise COM and EJB objects including instruction code and data tables to enable any tax calculation, or may be arranged as a framework of components including those above. The tax application server is protected by security firewalls, and all communication across the Internet is double firewalled. A "Tax Button" database 1080 communicating with the tax application server 1070 holds all data relating to taxing event determination for any given transaction. For the purpose of enabling remission of tax payments to the tax collection agency, the tax application server 1060 communicates via the Internet to a back end or legacy system 1090 of the tax collection agency. Actual payments may be transacted through the tax collection agency's bank database 1100. It will be appreciated that databases 1010, 1080 and 1100 are represented in this diagram by a single database, but may in fact be multiple databases. All updated data on applicable tax rates and rules is maintained at a central database 1080.

The tax application server 1060 may be hosted by an authorized and government-certified third party service provider, or the "Tax Button" functional module 1070 may be downloaded and installed in the business system, without trusted third party status. In a third system architecture, which provides a silent or embedded architecture, information surrounding each sale is passed proactively, or silently, to the "Tax Button" functional module 1070, which performs the appropriate tax calculation. A barcode demon or software agent monitors database 1010 to detect a sale transaction and sends the necessary information to the module 1070 for processing. The use of RFID smart price tags provides another silent technology for capturing sale transactions and passing the necessary information to the module 1070 for processing. The RFID smart tag may be preloaded with local price, tax and product information in the store, or may be preloaded with price and tax information relating to several tax jurisdictions before distribution.

The advantages offered by the present invention to Governments include error-free transactions, data processing efficiency, audit staff reductions, speed of money transfer and tax outturn, and improved citizen relationships and perception. The advantages to small businesses include instant ability to process sales in any jurisdiction, no need to purchase or operate sophisticated software on site, tax filing and payment burden removed, no audit liability on normal processing. The advantages to large businesses include accurate product/rate processing and reduced risk of absorbing errors, reduced audit costs and liabilities, lower costs of tax compliance, reduced costs of software.

The foregoing description has been presented to enable any person skilled in the art to make and use the invention, and is provided in the context of particular transaction applications and their requirements. Various modifications to the disclosed embodiments will readily be apparent to those skilled in the art, and the general principles defined herein may be applied to other embodiments and applications without departing from the spirit and scope of the present invention, which is defined by the claims which follow.

The invention claimed is:

1. A tax transaction system for handling the calculation and deduction of a tax due to a tax collection agency, comprising:
    a settlement agency server including a processor and memory;
        wherein the settlement agency server is configured to:
            receive, via a network, input relating to a taxing event involving a buyer and a seller including a first identifier related to the tax jurisdiction for the event and a second identifier related to the buyer and the seller;
            calculate the tax due on the taxing event based on the tax jurisdiction;
            divide a record of the taxing event into a net component and a tax component; and
            perform a dual transaction comprising:
                a first electronic monetary transaction for payment of the net component to the seller, and
                a second electronic monetary transaction for payment of the tax component to a third party computer system associated with a tax collection agency,
                wherein the
                first and second electronic transactions occur at substantially the same time.

2. The system of claim 1, wherein the settlement agency server receives taxing event input via a browser and a website, and wherein at least some of the identifiers are stored in a client database.

3. The system of claim 1, wherein the taxing event includes a tax transaction between the buyer and the seller involving a direct tax on income or capital.

4. The system of claim 1, wherein the taxing event is a sale transaction between the buyer and the seller involving an indirect or sales tax, and wherein the tax component comprises the indirect or sales tax.

5. The system of claim 4, wherein the sale transaction is initiated by the detection of the buyer clicking on a button displayed on a website offering a good or service for sale.

6. The system of claim 4, wherein the sale transaction is initiated by the detection of an electronic smart tag carrying product price data read by a point of sale device.

7. The system of claim 1, wherein the settlement agency server calculates the tax due on the taxing event via a software module or object comprising instruction code and data structures, residing in any one of: a client side computer system, a thin client, a server side computer system, a computer network, a mobile computing device, a programmable IC device embedded in a smartcard or RFID tag, a computer-readable storage media, and a software agent.

8. The system of claim 1, wherein the settlement agency server is configured to calculate a tax collection and payment commission charge, per taxing event.

9. A computer-readable storage medium having instructions embodied thereon, which, when executed by a processor, perform a method comprising:
    receiving input, via network, relating to a taxing event including a first identifier identifying the tax jurisdiction in which the event has occurred and a second identifier identifying information on a buyer and a seller to the taxing event;

calculating a tax due, via a tax calculation engine, wherein the tax collection engine is adapted to divide a record of the taxing event into a net component and a tax component;

performing a dual transaction comprising a first electronic monetary transaction for payment of the net component to the seller, and a second electronic monetary transaction for payment of the tax component to a third party computer system associated with a relevant tax collection agency; and transmitting to the third party computer system, information relating to the taxing event and the monetary transactions, on behalf of the buyer or seller in lieu of the buyer's or seller's summary tax returns.

10. The computer-readable storage medium of claim 9, wherein the method further comprises:

performing a payroll tax remission transaction to the third party computer system based on payroll information corresponding to the seller.

11. The computer-readable storage of claim 10, wherein the input is received over the network via a browser and a website, and wherein at least some of the identifiers are stored in a client database.

12. The computer-readable storage medium of claim 10, wherein the taxing event includes a tax transaction between the buyer and the seller involving a direct tax on income or capital.

13. The computer-readable storage medium of claim 10, wherein the taxing event is a sale transaction between the buyer and the seller involving an indirect or sales tax, and wherein the tax component comprises the indirect or sales tax.

14. The computer-readable storage medium of claim 13, wherein the sale transaction is initiated by the detection of the buyer clicking on a button displayed on a website offering a good or service for sale.

15. The computer-readable storage medium of claim 13, wherein the sale transaction is initiated by the detection of an electronic smart tag carrying product price data read by a point of sale device.

16. The computer-readable storage medium of claim 10, wherein the instructions for calculating the tax due on the taxing event are further embodied in any one of: a client side computer system, a thin client, a server side computer system, a computer network, a mobile computing device, a programmable IC device embedded in a smartcard or RFID tag, and a software agent.

17. The computer-readable storage medium of claim 10, wherein the method further comprises:

calculating a tax collection and payment commission charge, per taxing event.

18. A computer-implemented method for causing a calculation and deduction of a tax due to a tax collection agency, comprising:

receiving input, via a network, relating to a taxing event including a first identifier identifying the tax jurisdiction in which the event has occurred and a second identifier identifying information on a buyer and a seller to the taxing event;

calculating the a tax due, via a tax calculation engine, wherein the tax collection engine is adapted to divide a record of the taxing event into a net component and a tax component;

performing a dual transaction comprising a first electronic monetary transaction for payment of the net component to the seller, and a second electronic monetary transaction for payment of the tax component to a third party computer system associated with a relevant tax collection agency; and transmitting to the third party computer system, information relating to the taxing event and the monetary transactions, on behalf of the buyer or seller in lieu of the buyer's or seller's summary tax returns.

19. The computer-implemented method of claim 18, wherein said taxing event includes a tax transaction between said buyer and said seller involving a direct tax on income or capital.

20. The system of claim 1, wherein the settlement agency server is further configured to transmit to the third party computer system, information relating to the taxing event and the monetary transactions, on behalf of the buyer or seller, in lieu of the buyer's or seller's summary tax returns.

* * * * *

UNITED STATES PATENT AND TRADEMARK OFFICE
CERTIFICATE OF CORRECTION

PATENT NO. : 8,306,881 B2  
APPLICATION NO. : 12/898460  
DATED : November 6, 2012  
INVENTOR(S) : Druvaan B. Von Drehnen et al.

Page 1 of 1

It is certified that error appears in the above-identified patent and that said Letters Patent is hereby corrected as shown below:

Title Page, item (57) in the Abstract, line 14, "multi jurisdictional" should read --multi-jurisdictional--.

In the Claims:

Claim 18, col. 14, line 20, "the a tax due" should read --the tax due--.

Signed and Sealed this  
Thirtieth Day of April, 2013

Teresa Stanek Rea  
*Acting Director of the United States Patent and Trademark Office*